Sept. 25, 1956　　C. H. WIEGMAN ET AL　　2,764,247
SELF-PROPELLED POWER UNIT FOR DRIVING LARGE
POWER CONSUMING DEVICES Filed April 22, 1953　　3 Sheets-Sheet 1

INVENTORS.
CLARENCE H. WIEGMAN
DUDLEY S. KING.
AUGUST W. RICKENBACH
FREDERIC G. ROHM.
BY *Alden D. Redfield*
*Warren Kunz*
ATTORNEYS.

INVENTORS.
CLARENCE H. WIEGMAN.
DUDLEY S. KING.
AUGUST W. RICKENBACH.
FREDERIC G. ROHM.
BY Alden D. Redfield
Warren Kunz
ATTORNEYS.

United States Patent Office 2,764,247
Patented Sept. 25, 1956

2,764,247

SELF-PROPELLED POWER UNIT FOR DRIVING LARGE POWER CONSUMING DEVICES

Clarence H. Wiegman, Dudley S. King, and August W. Rickenbach, Williamsport, and Frederic G. Rohm, Montoursville, Pa., assignors to Avco Manufacturing Corporation, Cincinnati, Ohio, a corporation of Delaware Application April 22, 1953, Serial No. 350,383

4 Claims. (Cl. 180—53)

The present invention relates to a self-propelled power unit and, more specifically, to a vehicle having an engine, fluid coupling, and transfer gears for transferring power either to the vehicle or to a plurality of electrical generators carried by the vehicle.

Although the present invention is described with reference to a power unit having electrical generators, it should be understood that the invention is not limited to this specific form of equipment but may be used with equal advantage in conjunction with pumping equipment, electric welders, and comparable power consuming devices.

The preferred embodiment of the invention described in this specification concerns a portable power unit having electrical generators for starting aircraft engines. Although engine driven generator sets are widely used for this purpose today, they usually have to be drawn around an airfield by a tractor or other draft device. In contrast, the present invention provides a self-propelled vehicle having a source of power which is adequate for driving the electrical generators. Since the power required to drive the electrical generators is more than required by the vehicle, the unit disclosed is to be considered primarily a power unit and, secondarily, a self-propelled vehicle.

Briefly stated, the preferred embodiment of the present invention comprises a vehicle at the forward end of which is positioned an air-cooled engine in driving engagement with a fluid coupling. The fluid coupling drives a set of transfer gears which transfer power to a standard clutch and transmission installation such as is usually found in a vehicle of the type illustrated.

Engine power is transmitted directly to a mechanical clutch through which power may be transferred to an auxiliary drive shaft which delivers power to electrical generators located in the rear of the vehicle. It is these generators which deliver the energy for starting aircraft engines and energizing related equipment.

In view of the foregoing, it is obviously a broad object of this invention to provide a self-propelled vehicle having a power source and suitable mechanical elements for selectively driving electrical generators, or comparable energy consuming devices, carried by the vehicle.

Further, it is an object of the present invention to provide in a self-propelled vehicle a power source and a power consuming device with means, including a fluid coupling, for transferring power from the source to the device.

A more specific object of the invention is the provision in a self-propelled vehicle of a power source having an output shaft which is coaxially aligned with an auxiliary drive shaft for delivering power to a plurality of electrical generators located at the rear of the vehicle.

Another advantage of the invention is that engine power is delivered through a fluid coupling, making possible transfer of energy to the auxiliary drive shaft without a complicated gear box and friction clutch.

A still further object of the present invention is the provision in a vehicle of an internal combustion engine which is adapted to deliver sufficient power for driving auxiliary generators mounted on the vehicle, a fluid coupling and transfer gears being provided to make possible delivery of power either to the generators or to the vehicle or both.

Since the maximum power consumption of the generators is in excess of the power required to drive the vehicle, the fluid coupling not only facilitates transfer of power to the generators without a complicated gear box, but also assures smooth operation of the vehicle without necessitating a special transmission which would normally be required for an engine of such power is required by the generators.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
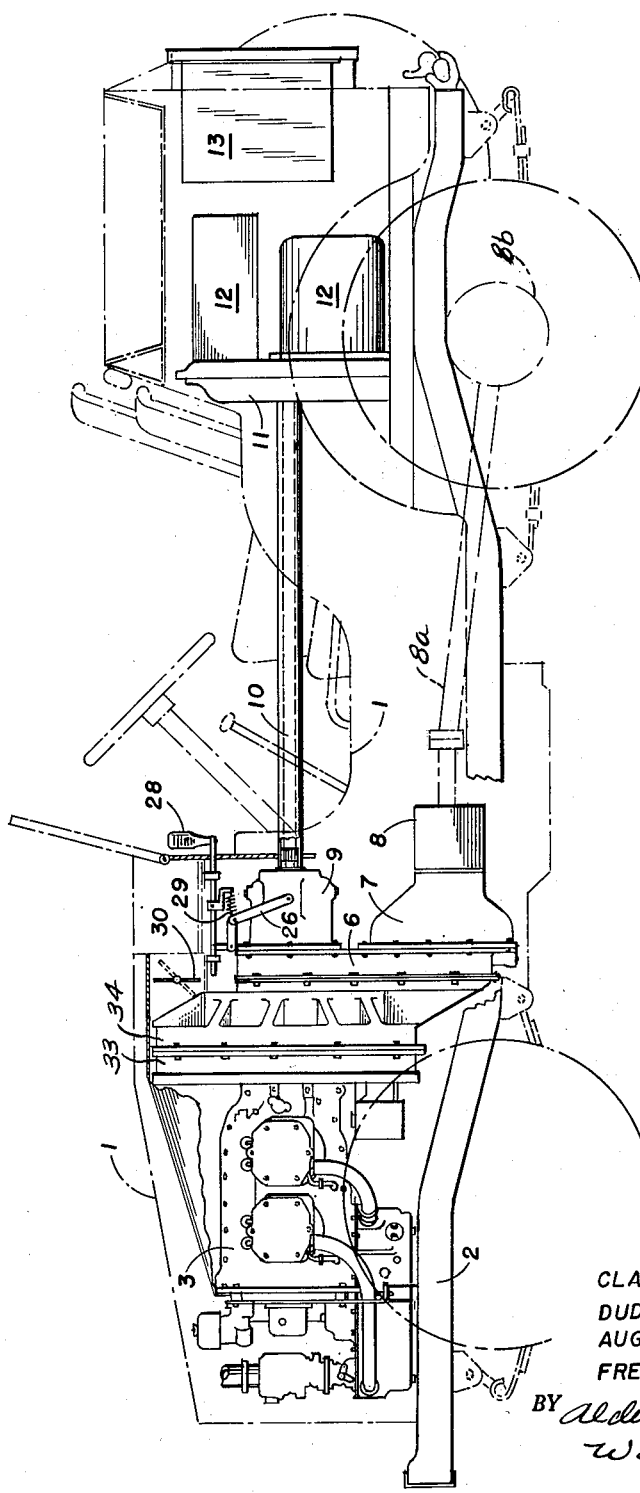
Figure 1 is a side elevational view of the vehicle, the engine, generators, and associated elements being shown in full lines, while the vehicle itself is shown in phantom lines.

With particular reference to Figure 1, there is shown in phantom lines a vehicle, generally designated 1, including a chassis 2 which supports an internal combustion engine 3. The engine delivers power to a fluid coupling 15 (see Figure 2) which in turn delivers power to transfer gears, generally designated 5 (see Figure 3), within casing 6. The transfer gears are arranged to deliver power either to a standard clutch and change speed gear transmission 7 and 8, respectively, or to an auxiliary clutch 9. Transmission 8 transfers power to a conventional drive shaft 8a which in turn drives the wheels of the vehicle through a differential 8b. When engaged, the auxiliary clutch delivers power to an auxiliary drive shaft 10 which serves as a power take-off shaft and conveys the power to a gear box 11 and a plurality of electrical generators 12.

The type of engine 3 is not critical in this invention, although it is considered desirable to provide an air-cooled opposed cylinder engine, since this type of engine has a high power-to-weight ratio and is excellently adapted for proper cooling and temperature regulation over a wide range of use. This is particularly important in a unit of the type disclosed which is intended for use by the armed services in an extreme range of climates where temperatures may vary from minus 65° F. to plus 130° F. The means adopted for assuring proper operation over this wide temperature range have not been disclosed since they do not constitute a part of the present invention. It should be understood, however, that the device disclosed is well suited to such extreme useage.

The generators 12 produce electrical energy for starting engines or for energizing other electrical devices. Since the aggregate power output of the generators may be in the order of 120 H. P., it will be appreciated that an electrical control system is desirable. For this reason, a control unit 13 is provided at the rear of the vehicle.

Figure 2:
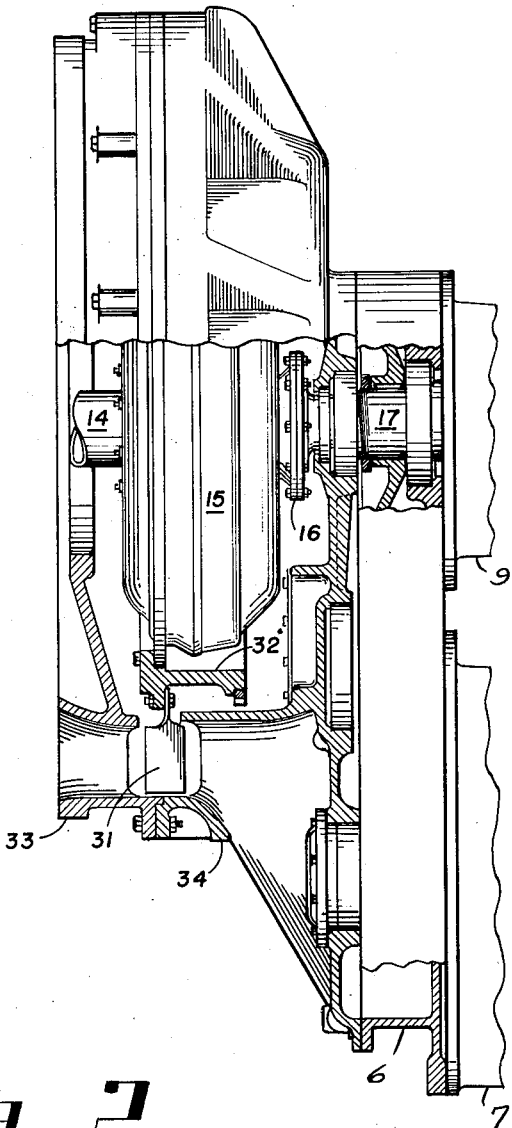
Figure 2 is a fragmentary view of the fluid coupling and transfer gear case located immediately behind the engine.
Figure 3:
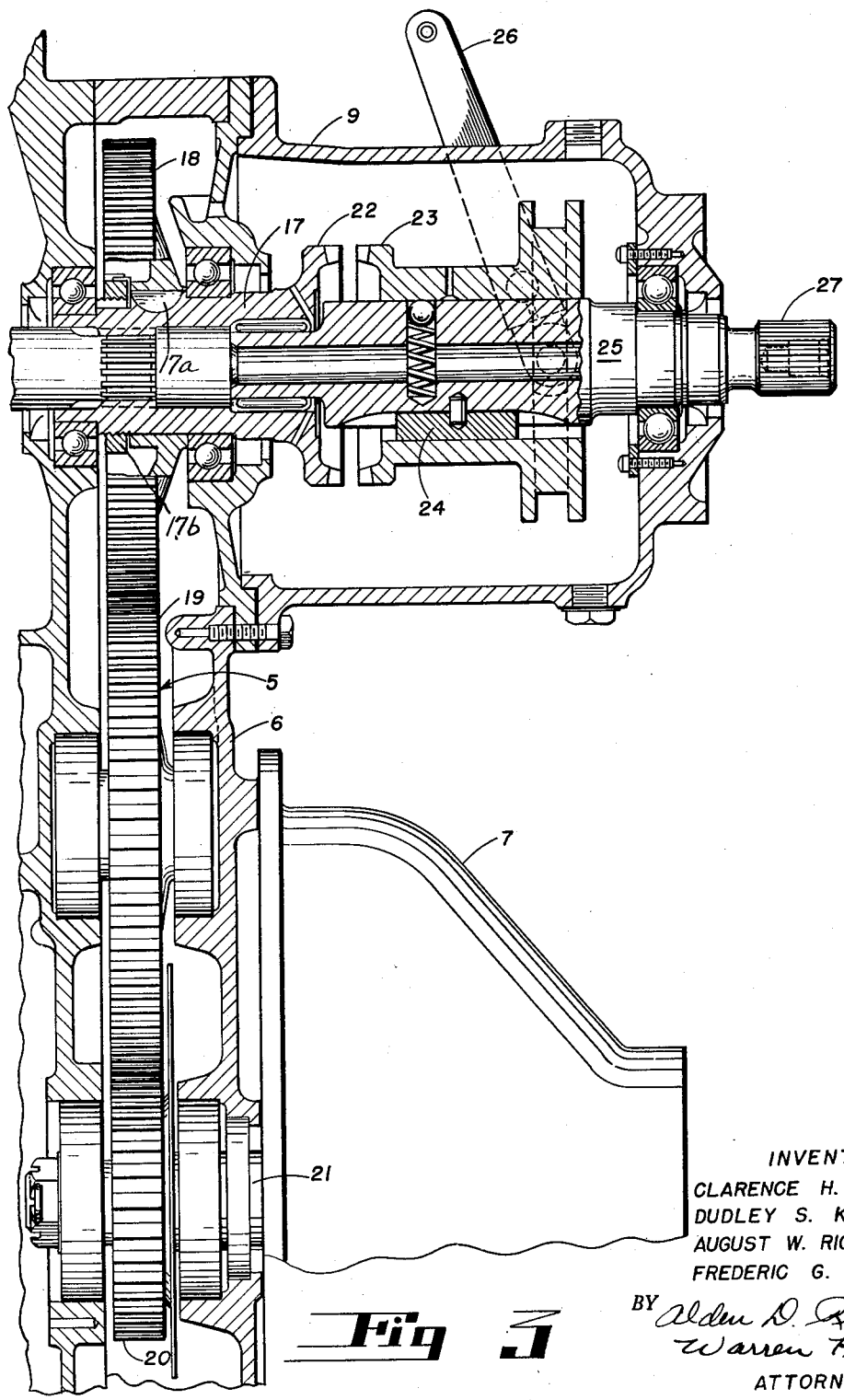
Figure 3 is a vertical cross sectional view showing the transfer gears and the auxiliary clutch through which power is transferred to the generators.

With particular reference to Figure 2, it will be noted that engine crankshaft 14 delivers power directly to a fluid coupling 15. The internal construction of the coupling has not been illustrated since it is a conventional unit, but it should be understood that it has a rotary internal member which transfers power through a flanged connection 16 to a stub shaft 17. As illustrated in Figure 3, a gear 18, which is one of the transfer gears, generally designated 5, is secured to shaft 17 by key 17a and nut 17b. Gear 18 meshes with an intermediate idler 19 which delivers power to gear 20. This latter gear delivers power through shaft 21 to clutch 7 and transmission 8 for driving the vehicle. Since the clutch and transmission are standard, their construction will not be described.

Auxiliary clutch 9 is shown in cross section in Figure 3. With reference to this figure, it will be noted that jaw 22 of the clutch is driven directly by shaft 17 to which gear 18 is secured and is positioned for engagement with a jaw 23 which is keyed, as at 24, to stub shaft 25. Jaw 23 is slidable on the stub shaft and may be shifted axially by control lever 26. When lever 26 is moved clockwise, as viewed in Figure 3, the jaws 22 and 23 are brought into engagement and power is transferred to the stub shaft 25.

A splined connection is provided at 27 between the stub shaft and the auxiliary drive shaft 10.

A manual auxiliary clutch control is provided in the cockpit of the vehicle at 28. Although it is not necessary to describe in detail the nature of this manual control, it is to be noted that it includes a spring 29 which, upon movement of control 28, resiliently shifts lever 26 for engaging and disengaging the auxiliary clutch. Through this mechanism, the auxiliary clutch may be engaged without damage despite rapid movement of the manual control.

As has been mentioned, engine 3 is preferably an air-cooled engine. Cooling air for the engine passes through a butterfly valve 30 which may be thermostatically controlled to maintain uniform engine temperatures. Airflow through the valve and over the engine is produced by a cooling fan 31 (see Figure 2) which may be directly secured to the periphery of a ring gear 32, carried by the exterior of fluid coupling 15. The casing sections 33 and 34, immediately adjacent the fan, are designed to direct the air from the butterfly valve through the fan and over the engine for cooling purposes.

Through the use of an air-cooled engine, it is possible to deliver continuous full power to the auxiliary generators without over-heating engine 3, and without benefit of forward motion of the vehicle. The conventional liquid cooled vehicle engine does not have sufficient cooling capacity to make such continuous power output possible.

Ring gear 32 is provided with gear teeth for engagement by a conventional engine starter (not shown) for starting engine 3.

Over-all operation of the unit may now be considered. It will be recognized by those skilled in the art that engine 3 is considerably larger than necessary for a vehicle of the type indicated. This engine may be of whatever power may be required to operate the generators or other auxiliary equipment. When the unit is being used to start aircraft, transmission 8 is shifted to a neutral position so that the vehicle remains at rest, and power is delivered to the auxiliary generators through fluid coupling 15, gear 18, auxiliary clutch 9, and auxiliary drive shaft 10. Under such conditions, the power produced by generators 12 under the control of unit 13 is delivered through suitable cables (not shown) directly to the aircraft engine starters.

After the aircraft engine has been started, the vehicle may be driven to a new location where still other engines are to be started. In driving the vehicle to the new location, manual control 28 is shifted to disengage auxiliary clutch 9, and standard transmission 8 is shifted to a drive position. Power then flows through fluid coupling 15, transfer gears 5, clutch 7, and transmission 8 to the standard differential and other drive elements of the vehicle.

Thus, the power of engine 3 may be delivered either to the generators 12 or to the vehicle, depending upon the engagement of auxiliary clutch 9 and the standard transmission 8. It should be recognized that both the vehicle and auxiliary generators could be energized simultaneously although such use would not be normal for a device of the type shown.

Inasmuch as all power delivered by engine 3 passes through fluid coupling 15, it will be recognized that this coupling is of use both in facilitating a smooth flow of power to the vehicle and to the generators 12. The provision of the coupling makes possible the transfer of a relatively large H. P. to the auxiliary generators without need for a gear box or a friction clutch. In this connection, it is to be noted that auxiliary clutch 9 is merely a mechanical means for establishing or breaking connection between the driving elements and auxiliary drive shaft 10.

The smooth application of power to the vehicle made possible by the fluid coupling makes the vehicle ideal for towing other apparatus, and for operation in mud, sand, etc., although such use is not the primary purpose of the vehicle.

An interesting feature of this invention is the arrangement of the transfer gears, fluid coupling, and auxiliary clutch. Normally, when engine 3 is idling and auxiliary clutch 9 is disengaged, the transfer gears and related mechanical elements will idle proportional to engine speed. It is not possible by manipulation of control 28 to engage clutch 9 under such conditions. Engagement of clutch 9 can be accomplished merely by shifting transmission 8 to a drive position and applying the brakes of the vehicle. When this has been done, the transfer gears will be held motionless, as will be the output shaft of the fluid coupling and its related clutch jaw 22. With jaw 22 motionless, jaw 23 can be shifted into engagement with ease and facility. Transmission 8 can then be shifted to a neutral position and gasoline supplied to engine 3 to deliver whatever power is necessary for driving generators 12.

The formation of clutch jaws 22 and 23 is such that engagement is not possible if the driving jaw is rotating. The presence of spring 29 permits the jaws to resist engagement under such conditions without damage despite the fact that manual control 28 has been forced to a position urging full engagement of the auxiliary clutch jaws. This safety feature precludes damage resulting from improper manipulation of control 28.

Since the device disclosed is primarily a power unit and only secondarily a vehicle, the elements have been arranged primarily to facilitate transfer of power from the engine to the auxiliary generators. Thus, it will be noted that the auxiliary drive shaft 10 is coaxial with the axis of the engine crankshaft and no intermediate transfer gears are necessary.

The transfer gears 5 facilitate the use of an engine, which is overpowered as far as the vehicle's requirements are concerned, and by suitable proportionality of the gears it is possible to match engine output and vehicle speed for optimum performance.

By using a common power source, such as engine 3, for both driving the vehicle and powering the generators, it is possible to conserve weight and space. It will be appreciated that this is an important factor, particularly in any portable equipment.

Although the present invention has been described with particular reference to a plurality of electrical generators, it should be understood that a single generator might be provided, in which event gear box 11 would not be necessary. Similarly, if the unit were used for powering a portable pump, instead of the generators, suitable modifications could be made at the rear of the vehicle without changing any of the related drive elements at the forward portion of the vehicle.

Having described a preferred embodiment of our invention, we claim:

1. In combination in a self-propelled power unit, a vehicle including a power source at its front end and a plurality of supporting ground wheels, a fluid coupling driven by said power source located at substantially the same vertical level as said power source, vertically arranged transfer gears driven by said fluid coupling, a clutch and transmission unit for delivering power to said ground wheels of said vehicle, said clutch and transmission unit being located at a level vertically below said power source and being driven by said vertical transfer gears, an auxiliary clutch driven by said fluid coupling, a power take-off shaft connected to said auxiliary clutch, said power take-off shaft being at substantially the same vertical level as said fluid coupling, a gear box at the rear of said vehicle for receiving power from said power take-off shaft, and power consuming means driven by said gear box.

2. Apparatus as set forth in claim 1, in which said power take-off shaft is coaxial with said fluid coupling.

3. Apparatus as set forth in claim 1, in which said vehicle includes a cockpit for occupancy by the user, means within said cockpit connected to and controlling said auxiliary clutch.

4. Apparatus as defined in claim 1, in which the power requirements of said power consuming means are greater than the power required for driving said vehicle and in which the size of said power source is sufficient to supply the requirements of said power consuming means and said vehicle.

References Cited in the file of this patent

UNITED STATES PATENTS

| | | |
|---|---|---|
| 1,919,227 | Knox et al. | July 25, 1933 |
| 2,001,029 | Kulick et al. | May 14, 1935 |
| 2,016,934 | Smith | Oct. 8, 1935 |
| 2,282,597 | Archer | May 12, 1942 |
| 2,291,124 | Wallace | July 28, 1942 |
| 2,375,205 | Barras | May 8, 1945 |
| 2,524,598 | Lapsley | Oct. 3, 1950 |
| 2,680,377 | Gerst | June 8, 1954 |

FOREIGN PATENTS

| | | |
|---|---|---|
| 271,183 | Great Britain | May 26, 1927 |
| 220,075 | Switzerland | June 16, 1942 |